(12) United States Patent
Long et al.

(10) Patent No.: US 6,636,650 B1
(45) Date of Patent: Oct. 21, 2003

(54) METHOD AND APPARATUS FOR AUTOMATICALLY POSITIONING IMAGES WITHIN A REGION

(75) Inventors: Timothy Merrick Long, Lindfield (AU); George Politis, Macquaire Fields (AU); Marija Herceg, Lindfield (AU); Lincoln David Stone, Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/565,469

(22) Filed: May 5, 2000

(30) Foreign Application Priority Data

May 10, 1999 (AU) .............................................. PQ0278

(51) Int. Cl.⁷ ................................................. G06K 9/32
(52) U.S. Cl. ...................................... 382/295; 382/294
(58) Field of Search ................................. 382/295, 294; 345/634, 639, 640

(56) References Cited

U.S. PATENT DOCUMENTS 5,680,532 A * 10/1997 Amakawa et al. .......... 345/473
5,781,174 A * 7/1998 Uya et al. .................... 345/639
6,526,182 B2 * 2/2003 Morita ........................ 382/294

FOREIGN PATENT DOCUMENTS

| AU | B-55416 | 8/1998 | ............. G06T/1/00 |
| AU | 714221 | 8/1998 | |

* cited by examiner

Primary Examiner—Phuoc Tran
(74) Attorney, Agent, or Firm—Fitzpatrick, Cella, Harper & Scinto

(57) ABSTRACT

A method of automatically positioning one or more images within a region. The method comprises of computing (101) a field at each image due to every other image, wherein the field at any image due to any other image is a function of the distance between any image and any other image and the surface area of that any other image. The method then computates (102) a net force exerted on each image by every other image, wherein the net force acting on any one image is a function of the field acting on the said any one image and a characteristic of the said any one image. The method then moves (104) each image a distance, which is a function of the net force acting on the image, in the direction of the net force.

43 Claims, 5 Drawing Sheets

METHOD AND APPARATUS FOR AUTOMATICALLY POSITIONING IMAGES WITHIN A REGION

FIELD OF INVENTION

The present invention relates to a method and apparatus for automatically positioning one or more images within a region. The invention also relates to a computer readable medium having recorded thereon a computer program for automatically positioning one or more images within a region.

BACKGROUND

Electronic photo-albums have become increasingly popular in recent times. These electronic photo-albums typically take the form of a collection of images stored using a non-volatile memory device, from which a user can retrieve the image for displaying on a display device. Usually, the images are gathered in digital form, and may, for example, be scanned by an electronic scanner, down-loaded from the Internet or produced by a digital camera. A collection of these images can be stored electronically to create an electronic photo-album, analogous to the traditional family photo-album, which uses photographic prints.

Presently, electronic photo-albums take the form of a collection of images, a user of the album being able to associate a caption or brief description with each image. For example, a user can collect a series of family photographs of a wedding, whether from a digital video or still camera, and associate a caption such as a date and a brief description of the event with each image. If desired, an electronic photo-album can be reproduced from the memory device by a high quality output device, such as a high-resolution colour printer, to produce an album substantially similar to a conventional photo-album.

The images of electronic photo-albums are typically arranged on an electronic page to provide a visually pleasing arrangement. Typically, the user manually undertakes the arrangement of the images.

Australian Patent 714221 corresponding to U.S. patent application Ser. No. 09/026,614 filed on Feb. 20, 1998 describes a method for automatically arranging digital images to produce pleasing results. In particular, the method initially arranges the images on the page in accordance with a first predetermined layout pattern. The method then rearranges the images in accordance with a predetermined set of rules. The following are examples of types of such rules: 1) Non Printable Area Rule: acts to constrain images within a predetermined layout. 2) Controlled Overlapping Rule: provides no overlapping on a page, or at least minimising the amount of overlapping required for a given set of images. However, if it is desired that the images overlap, the controlled overlapping rule may be employed to control the style and amount of overlapping for each image. 3) Vertical Space Distribution Rule: balances (or evens out) space distribution surrounding images in a vertical direction. Often, unprinted or unused space on a page surrounding an image is referred to as "white space", and the Vertical Space Distribution Rule attempts to balance the white space above and below an image. 4) Horizontal Space Distribution Rule: substantially similar to the Vertical Space Distribution Rule, but acts in the horizontal direction. 5) Edge Alignment Rule: aligns alike edges of images that fall within a predetermined range threshold position both horizontally and vertically. 6) Adjacent Edges Rule: keeps adjacent edges of images on a page a predetermined minimum or maximum distance apart. 7) Centre Attraction Rule: positions an image of a predetermined central line of the layout area.

These various rules are not rigidly satisfied for every positioning of images on a page. In some cases, this is not possible, as the application of different rules may result in mutually opposing requirements in terms of image placement. The various rules are satisfied in a proportional manner to achieve an optimum compromise that provides a desired result. Accordingly, each rule by itself does not result in a desired result for all circumstances. Moreover, the application of one or more said rules, in some circumstances, does not necessarily result in a pleasing arrangement of images.

SUMMARY OF THE INVENTION

It is an image of the present invention to provide an alternative method and/or ameliorate one or more disadvantages of the prior art.

According to a first aspect of the invention, there is provided a method of automatically positioning a plurality of images within a region, the method comprising the steps of: (a) computing a net force exerted on each said image by all other said images, wherein the net force exerted on each said image is the total of forces exerted on that image, and wherein any said force exerted on any one said image by any other said image is a function of the distance between the said any one image and the said any other image, a first image characteristic of said any one image and a second image characteristic of said any other image; and (b) moving each said image a distance, which is a function of the net force acting on the image, in the direction of the net force.

According to a second aspect of the invention, there is provided a method of automatically positioning a plurality of images within a layout region, wherein the images are defined by a height h and width w and the method comprises the following steps of:

(a) computing a field E at each said image due to every other said image, where a said field E due to a said image at a distance p from the centre of the image is $$E = \frac{\alpha}{\left(\frac{d_x}{w}\right)^2 + \left(\frac{d_y}{h}\right)^2} + (1-\alpha)\frac{wh}{d_x^2 + d_y^2},$$

where $$\alpha = \frac{wh}{p^2}$$

when p is greater than $\sqrt{wh}$ and a $\alpha=1$ when p is less than or equal to $\sqrt{wh}$, and $d_x$ is the horizontal distance and $d_y$ is the vertical distance components of distance p; (b) computing a sum of forces exerted on each said image by every other said image, where said sum of forces acting on any said image is equal to a sum of said fields acting on said any image multiplied by the surface area wh of said any image; (c) moving each said image a distance proportional to the sum of forces acting on the image, in the direction of the sum of forces; and (d) repeating steps (a) to (c) a predetermined number of times.

According to a third aspect of the invention, there is provided a method of automatically positioning one image within a region of one or more other images, the method comprising the steps of: (a) computing a net force exerted on said one image by all of said other images, wherein the net force exerted on said one image is the total of forces exerted on that image, and wherein any said force exerted on said one image by any one of said other images is a function of the distance between the said one image and the said any one of the said other images, a first image characteristic of said one image and a second image characteristic of said any one of the said other images; and (b) moving said one image a distance, which is a function of the net force acting on the said one image, in the direction of the net force.

According to a fourth aspect of the invention, there is provided apparatus for automatically positioning a plurality of images within a region, the apparatus comprising: means for computing a net force exerted on each said image by all other said images, wherein the net force exerted on each said image is the total of forces exerted on that image, and wherein any said force exerted on any one said image by any other said image is a function of the distance between the said any one image and the said any other image, a first image characteristic of said any one image and a second image characteristic of said any other image; and means for moving each said image a distance, which is a function of the net force acting on the image, in the direction of the net force.

According to a fifth aspect of the invention, there is provided apparatus for automatically positioning a plurality of images within a layout region, wherein the images are defined by a height h and width w and the apparatus comprises: means for computing a field E at each said image due to every other said image, where a said field E due to a said image at a distance p from the centre of the image is $$E = \frac{\alpha}{\left(\frac{d_x}{w}\right)^2 + \left(\frac{d_y}{h}\right)^2} + (1-\alpha)\frac{wh}{d_x^2 + d_y^2},$$

where $$\alpha = \frac{wh}{p^2}$$

when p is greater than $\sqrt{wh}$ and $\alpha=1$ when p is less than or equal to $\sqrt{wh}$, and $d_x$ is the horizontal distance and $d_y$ is the vertical distance components of distance p; means for computing a sum of forces exerted on each said image by every other said image, where said sum of forces acting on any said image is equal to a sum of said fields acting on said any image multiplied by the surface area wh of said any image; means for moving each said image a distance proportional to the sum of forces acting on the image, in the direction of the sum of forces; and means for repeating the operations of the means for computing a field, the means for a sum of forces, and the means for moving a predetermined number of times.

According to a sixth aspect of the invention, there is provided apparatus for automatically positioning one image within a region of one or more other images, the apparatus comprising means for computing a net force exerted on said one image by all of said other images, wherein the net force exerted on said one image is the total of forces exerted on that image, and wherein any said force exerted on said one image by any one of said other images is a function of the distance between the said one image and the said any one of the said other images, a first image characteristic of said one image and a second image characteristic of said any one of the said other images; and means for moving said one image a distance, which is a function of the net force acting on the said one image, in the direction of the net force.

According to a seventh aspect of the invention, there is provided a computer readable medium comprising a computer program for automatically positioning a plurality of images within a region, the computer program comprising: code for computing a net force exerted on each said image by all other said images, wherein the net force exerted on each said image is the total of forces exerted on that image, and wherein any said force exerted on any one said image by any other said image is a function of the distance between the said any one image and the said any other image, a first image characteristic of said any one image and a second image characteristic of said any other image; and code for moving each said image a distance, which is a function of the net force acting on the image, in the direction of the net force.

According to an eighth aspect of the invention, there is provided a computer readable medium comprising a computer program for automatically positioning a plurality of images within a layout region, wherein the images are defined by a height h and width w and the computer program comprises: code for computing a field E at each said image due to every other said image, where a said field E due to a said image at a distance p from the centre of the image is $$E = \frac{\alpha}{\left(\frac{d_x}{w}\right)^2 + \left(\frac{d_y}{h}\right)^2} + (1-\alpha)\frac{wh}{d_x^2 + d_y^2},$$

where $$\alpha = \frac{wh}{p^2}$$

when p is greater than $\sqrt{wh}$ and $\alpha=1$ when p is less than or equal to $\sqrt{wh}$, and $d_x$ is the horizontal distance and $d_y$ is the vertical distance components of distance p; code for computing a sum of forces exerted on each said image by every other said image, where said sum of forces acting on any said image is equal to a sum of said fields acting on said any image multiplied by the surface area wh of said any image; code for moving each said image a distance proportional to the sum of forces acting on the image, in the direction of the sum of forces; and code for repeating the operations of the means for computing a field, the means for a sum of forces, and the means for moving a predetermined number of times.

According to an ninthe aspect of the invention, there is provided a computer readable medium comprising a computer program for automatically positioning one image within a region of one or more other images, the computer program comprising: code for computing a net force exerted on said one image by all of said other images, wherein the net force exerted on said one image is the total of forces exerted on that image, and wherein any said force exerted on said one image by any one of said other images is a function of the distance between the said one image and the said any one of the said other images, a first image characteristic of said one image and a second image characteristic of said any one of the said other images; and code for moving said one image a distance, which is a function of the net force acting on the said one image, in the direction of the net force.

BRIEF DESCRIPTION OF THE DRAWINGS

Embodiments of the invention are described with reference to the drawings, in which.

DETAILED DESCRIPTION

Overview of Preferred Method

The invention provides a method of automatically positioning one or more images within a region. The principles of the preferred method described herein have general applicability to and have been described in relation to rectangular images within a polygonal region. However, the invention is equally applicable to more irregular curved shaped images and regions. The term "image" or "images" as used herein is taken to include picture(s), photograph(s), lithograph(s), engraving(s), etches, icon(s), graphical object (s) or any other visual representation(s). Furthermore, the preferred method has particular application to the automatic positioning of images, within a page of an electronic photo-album on a personal computer.

Figure 1:
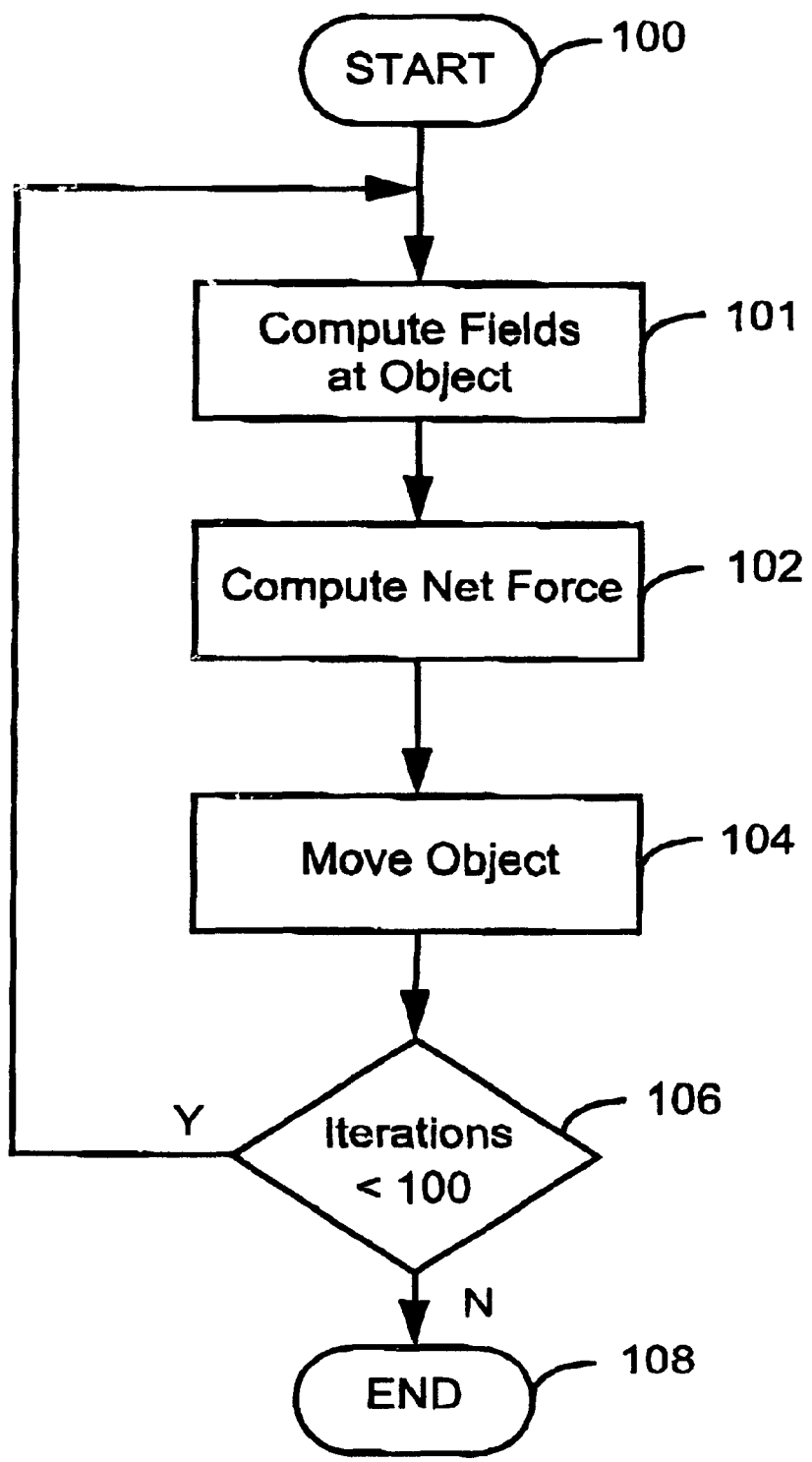
FIG. 1 is a flow diagram of a method of automatically positioning one or more images within a region in accordance with the preferred embodiment.

Turning now to FIG. 1, there is shown a flow diagram of the preferred method of automatically positioning one or more images within a region. The method commences at step 100 and allocates each image an initial position. The method then enters an iteration phase 101-102-104-106 wherein each iteration uses the previous positions of the images to compute a new position for each image. The new position is computed by simulating the effect of electrostatic forces that would exist if each image contained at its centre an electrostatic point charge, where the magnitude of charge is equal to the surface area of the image and the electrostatic field around the charge is approximately elliptical. The method firstly computes 101 such fields at each image due to every other image. Alternatively, the method may be modelled on electrostatic forces, where the electrostatic field around the charge is circular. The layout region boundaries also repel each image. Once the net force on each image has been computed 102, the force is interpreted as a distance and direction and the method moves the image 104 in order to find its new position. Some images may be marked as immovable. The method then continues at decision block 106, where a check is made whether the number of iterations is less than a predefined number. If the decision block returns true (Yes) then the processing returns to step 102, otherwise the processing stops at 108. Alternatively, the iterations can be stopped when the change in the positions of the images is less than some threshold amount. The positions of the images following the iterations is an aesthetically pleasing layout. Preferably, the preferred embodiment is used in an electronic photo album.

Initial Positions

Figure 2:
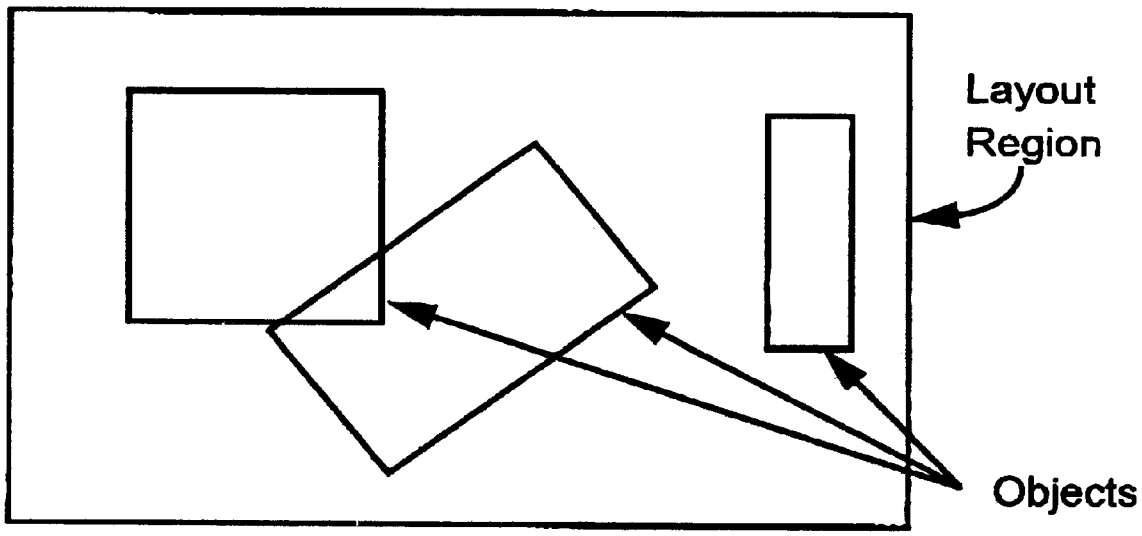
FIG. 2 shows three image rectangles in initial positions within a layout region as an example of an initial layout.

Before the method begins iterating to compute the positions of the images, each image is allocated an initial position in the layout region. These positions may be generated randomly or be part of a predefined pattern. FIG. 2 shows three image rectangles in initial positions within a layout region.

Electrostatic Model

The iteration phase of the method uses an electrostatic model to compute new positions for images. In this model, each image is replaced by a point charge of like charge positioned at the image's centre point. The magnitude of a point charge is the same as the surface area of the image it represents.

The electrostatic model used in this method does not accurately represent the interactions of physical point charges. The principal differences are the shape of the electrostatic field around each charge and the interpretation of a force on a charge as a distance to move.

Figure 3:
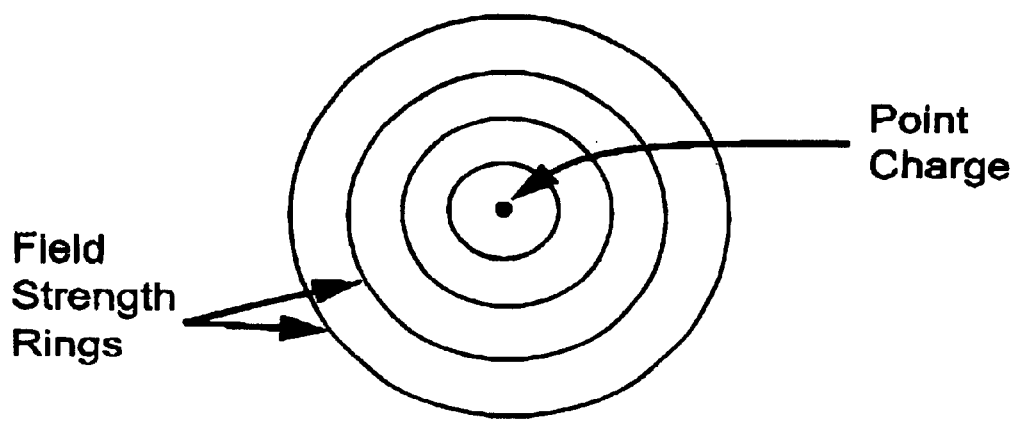
FIG. 3 shows an example of an electrostatic field around a physical point charge used in a first preferred embodiment.

Each point charge is surrounded in space by its electrostatic field, which is a region of infinite size. At any point in the field the field has a strength value; a field is strongest close to its charge. The field exerts a force on other point charges within it, and the magnitude of this force is proportional both to the strength of the field at that position and to the magnitude of the other charge. FIG. 3 shows the electrostatic field around a physical point charge. Each ring in the figure represents a particular field strength value. That is, given any ring in FIG. 3, the strength of the field will be the same for all points on that ring. As can be seen, the electrostatic field around a physical point charge is essentially circular. This results from the fact that the strength of the field at some point in it is dependent only on the distance of that point from the point charge (since all points on a circle are the same distance from the centre of that circle).

Figure 4:
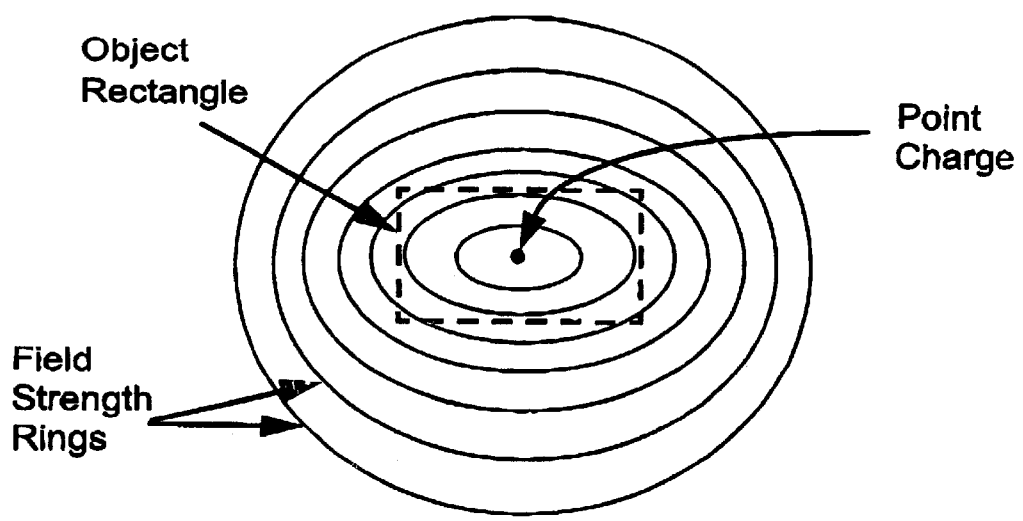
FIG. 4 shows an example of an electrostatic field used in a second preferred embodiment.

The electrostatic model used in this method uses essentially elliptical fields around point charge. The shape of the field becomes more circular as the point of interest moves further from the point charge however. Close to the point charge, the rings defining the strength of the field are ellipses with the same aspect ratio as the image rectangle the charge represents. Further from the point charge the field strength rings become progressively more circular. FIG. 4 shows the shape of the electrostatic field used in this model. The justification for the model will be discussed later.

When an electrostatic field exerts a force on a physical point charge, the point charge will undergo acceleration that is inversely proportional to its mass. To simulate this effect iteratively, the system would have to maintain an instantaneous velocity value for each image point charge. The model used in this method, however, simulates the effect of a force on a point charge by moving the charge a distance proportional to the force and ignoring velocity.

Figure 5:
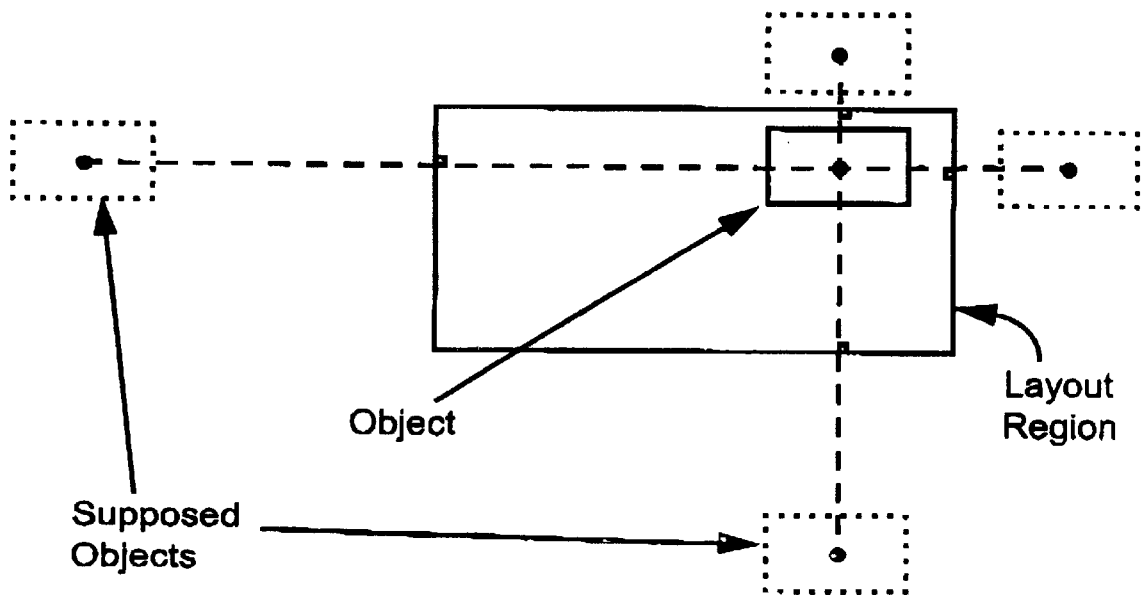
FIG. 5 shows an example of the electrostatic effects of the layout region boundaries on an image in accordance with a prefer embodiment.

To prevent the electrostatic repulsion forcing images out of the layout region or up against its boundaries, the model includes a repulsive force exerted on each image by each boundary. The force on an image by a boundary is the same as would be exerted by an image (the supposed image) of the same size and shape on the opposite side of the boundary. If the image being considered is a distance d from the boundary along a line perpendicular to the boundary, the supposed image is also distance d from the boundary along the same perpendicular. These images are not strictly part of the interaction between images as they only exert a force on the image to which they correspond. FIG. 5 shows a single image in a layout region along with the supposed images used to determine the electrostatic effect of the layout region boundaries on that image.

Computation

Each iteration of the method computes for each image in the layout the net force that is exerted on that image by other images and the boundaries of the layout region. The fundamental computation involved is computing the force exerted on one image point charge by another image point charge. This requires calculating the strength of the electrostatic field belonging to the second charge at the position of the first charge.

Consider the electrostatic field around a charge of magnitude Q. For physical point charges it follows from Coulomb's Law that the strength of the electrostatic field a distance r from the charge is E defined as follows (ignoring constant multipliers).

$$E = \frac{Q}{r^2} \quad \text{(Eq. 1)}$$

The field is circular so for any circle centred at the charge position, the strength of the field will be the same at all points on that circle. Determining the strength of the field at a given point, then, can be considered to require determining on which circle the point belongs (which will be the circle of radius r in this case).

A similar approach is used when calculating the strength of an elliptical field. Consider the equation for x and y describing an axis-parallel (that is, its major and minor axes are parallel to the x and y axes) ellipse centred at the point $(x_c, y_c)$ whose height is h and width is w as follows.

$$\left(\frac{x - x_c}{w/2}\right)^2 + \left(\frac{y - y_c}{h/2}\right)^2 = 1 \quad \text{(Eq. 2)}$$

The equation for any axis-parallel ellipse that has the same centre point and aspect ratio (ratio between width and height) as the above can be defined by including new parameter $\lambda$ as follows.

$$\left(\frac{x - x_c}{\lambda w/2}\right)^2 + \left(\frac{y - y_c}{\lambda h/2}\right)^2 = 1 \quad \text{(Eq. 3)}$$

The strength of an elliptical field is the same for all points on a given ellipse centred at the point charge. Thus to calculate the strength of the field at some point (x, y), the value of $\lambda$ defining the ellipse that the point is on can be determined by the following equation (introducing $d_x$ as the horizontal distance between the point and the point charge and $d_y$ as the vertical distance). Note that if $d_x$ and $d_y$ are both approximately zero, some arbitrary non-zero (but small) distance should be defined.

$$\lambda = \sqrt{\left(\frac{x - x_c}{w/2}\right)^2 + \left(\frac{y - y_c}{h/2}\right)^2} = \sqrt{\left(\frac{d_x}{w/2}\right)^2 + \left(\frac{d_y}{h/2}\right)^2} \quad \text{(Eq. 4)}$$

Then some relationship can be defined between $\lambda$ and the field strength. Here the strength of an elliptical field at points on an ellipse of height h and width w is defined to be the same as the strength of a circular field on a circle of radius $$\frac{(\sqrt{wh})}{2}.$$

This adheres to Coulomb's Law when w=h (which would be a circular field) and provides some average of the ellipse's width and height. By substituting into equation 1, the elliptical field strength on an ellipse of height $\lambda h$ and width $\lambda w$ is as follows.

$$E = \frac{4Q}{\lambda^2 wh} \quad \text{(Eq. 5)}$$

Combining equations 4 and 5 produces the following.

$$E = \frac{4Q}{wh\left(\left(\frac{d_x}{w/2}\right)^2 + \left(\frac{d_y}{h/2}\right)^2\right)} = \frac{Q}{wh\left(\left(\frac{d_x}{w}\right)^2 + \left(\frac{d_y}{h}\right)^2\right)} \quad \text{(Eq. 6)}$$

Equation 6 defines the strength of an axis-parallel elliptical field around a charge of magnitude Q a distance $(d_x, d_y)$ from the charge where the aspect ratio of the field ellipses is defined by width w and height h.

The electrostatic model in this method defines the shape of the elliptical field close to a point charge representing an image to have the same aspect ratio as the image. That is, w and h in equation 6 are the width and height of the image. Further, the magnitude of the charge representing an image is equal to the image's surface area, which is the product of its width and height. Hence equation 6 may be simplified as follows.

$$E = \frac{1}{\left(\frac{d_x}{w}\right)^2 + \left(\frac{d_y}{h}\right)^2} \quad \text{(Eq. 7)}$$

FIG. 4 shows that the electrostatic field used by the model is not consistently elliptical. The field is defined as being elliptical (with the aspect ratio of the image being represented) as far as $\sqrt{wh}$ from the point charge, then tending to become more circular. The rationale for this is that the further some point is from the point charge, the less effect the shape of the image being represented should have on the field. In other words, the electrostatic field model has an elliptical field as a near field and a circular field as a far field. For points distance p from the point charge, where p is greater than $\sqrt{wh}$, the degree of ellipticity of the field is described by factor $\alpha$ defined as follows.

$$\alpha = \frac{wh}{p^2} \quad \text{(Eq. 8)}$$

Then the strength of the field at points distance p from the point charge where p is less than or equal to $\sqrt{wh}$ is defined by equation 7. Where p is greater than $\sqrt{wh}$ the field strength is defined in equation 9.

$$E = \frac{\alpha}{\left(\frac{d_x}{w}\right)^2 + \left(\frac{d_y}{h}\right)^2} + (1 - \alpha)\frac{wh}{d_x^2 + d_y^2} \quad \text{(Eq. 9)}$$

To calculate the force exerted on a first point charge by the field of a second point charge in this model, equations 7 and 9 are used to compute the field strength at the position of the first point charge. Then this is multiplied by the magnitude of the first charge (since field strength is defined as the force exerted per unit charge by the field).

At each iteration, the method computes the force exerted on each image point charge by each other point charge and by the supposed images used to repel from the layout boundaries. Each image is then moved a distance proportional to the net force exerted on it, in the direction of the net force. The factor by which the net force is multiplied to calculate the distance to move is empirically determined to cause the most 'sensible' or aesthetically pleasing results. The factor used in one embodiment is 0.001. The direction of the net force is perpendicular to the tangent of field at the first point.

Note also that the image point charges are prevented from moving onto or outside of a layout boundary. If this occurs the image is positioned with its centre point (the position of its charge) just inside the layout boundary (by some small predetermined distance).

Figure 6:
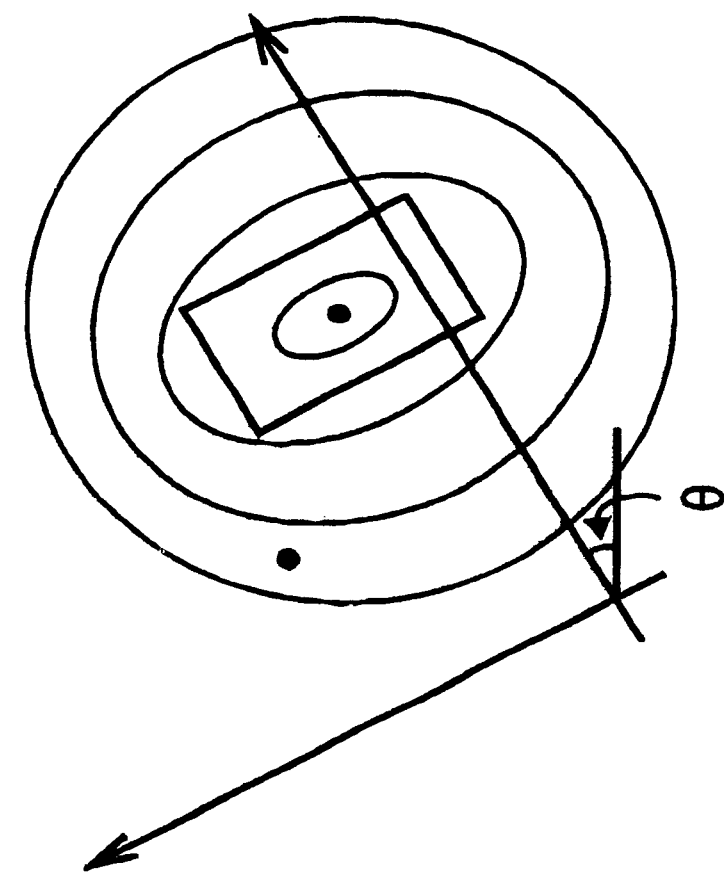
FIG. 6 shows an example of an non-parallel axis image before and after rotation in accordance with a preferred embodiment.
Figure 6:
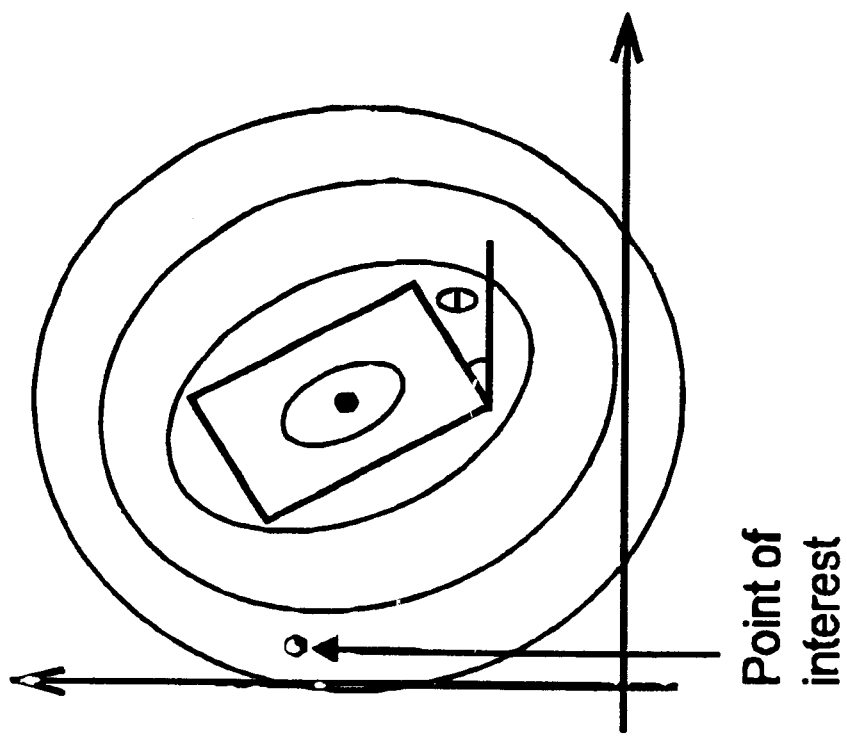

The above discussion describes the calculation of the force exerted on a charge by an axis-parallel elliptical field in the model. Because the model permits image rectangles in the layout region to be rotated, it is desirable that fields that are not axis-parallel are taken into account. One approach to this problem is to effectively rotate the coordinate axes in order to make the field axis-parallel before performing the calculations described above. When the net force on a point charge is calculated, its direction is adjusted by rotating the axes back to their original orientations. FIG. 6 shows a non-axis parallel image before and after rotation of the axes. Preferably, the angle of rotation of the axes is determined by calculating the angle of the main axis of the image rectangle to the horizontal axis of the region.

Rotation of the axes by some angle θ can be achieved by transforming the coordinates of all points by −θ around the origin. The rotation of a point by angle α about the origin can be achieved by the following transformation (where $(x_1, y_1)$ are the initial point coordinates and $(x_2, y_2)$ are the coordinates after rotation).

$$\begin{bmatrix} x_2 \\ y_2 \end{bmatrix} = \begin{bmatrix} \cos\alpha & -\sin\alpha \\ \sin\alpha & \cos\alpha \end{bmatrix} \begin{bmatrix} x_1 \\ y_1 \end{bmatrix} \quad \text{(Eq. 10)}$$

Once the location of the point of interest and the point charge creating the field have been rotated about the origin, the values of $d_x$ and $d_y$ can be determined and then equations 7 and 9 used to compute the field and then force exerted on the image at the point of interest. To adjust the force direction to account for the rotated axes, consider the force's horizontal and vertical components, $(f_x, f_y)$ and rotate these by θ about the origin (using equation 10) to effect a rotation of the axes by −θ. The result will be the force (and direction of the force) exerted on a charge by a non-axis-parallel elliptical field. Alternatively, the field direction may be adjusted in a similar manner and the force calculated by multiplying the field strength by the magnitude of the first charge.

Alternative Preferred Embodiments of Method

There are a number of ways in which the method described above may be adjusted.

Rather than making the magnitude of a point charge representing some image equal to the surface area of the image, it could be equal to the perimeter of the image or some other image characteristic. This would affect the simplification from equation 6 to equation 7. It is recommended that the magnitude of charge correspond to some measure of the image's size, since it seems reasonable that in aesthetically pleasing image layouts, large images are further from small images than small images are from each other.

In this electrostatic model, the force acting on a first image due to a second image is dependent on the distance between them and on the magnitude of charge of the first image multiplied by the magnitude of charge of the second image. Preferably, the magnitude of charge in both these instances corresponds to the respective surface areas of the first and second images. Namely, the magnitudes of charge of both images are determined from the same image characteristic. Alternatively, the magnitudes of charge of both images can be determined from different image characteristics. For example, the magnitude of charge of the first image is determined from the surface area of the first image and the magnitude of charge of the second image is determined from the perimeter of the second image.

The preferred method computes each field at an image and then computes each associated force exerted on the image. The preferred method then sums these forces to compute the total force exerted on the image exerted by all the other images. Alternatively, the method can calculate the total field at an image due to all other images and then compute the total force due to this total field.

In alternative embodiment, the electrostatic model could be adjusted so that the strength of the field is inversely proportional to the distance from the charge or some other relationship to the distance. Preferably, the strength be inversely proportional to a polynomial of distance because the strength (and hence the force it exerts on other images) should decrease as one moves away from the charge.

Rather than the relationship between the distance moved by an image in a single iteration and the net force exerted on it being a proportion with some empirically determined factor, other relationships may be used. One alternative is to recognise instantaneous velocity and acceleration of images by the forces, where the 'mass' of an image is dependent on the image's size (since acceleration is proportional to force and inversely proportional to mass).

Another alternative to using an empirically determined force/distance factor is to compute the factor during the first iteration of the method. An approach to calculating the factor is to identify the largest net force being applied to an image in the model in the first iteration, decide how far this image should be moved and thereby calculate the force/distance factor. An approach to deciding how far to move the image is to calculate the strength of all image fields combined at a number of points along the line that the image may move (that is, along the line parallel to the force on the image that extends from the image to a boundary of the layout region). The strengths of the fields of all images may be summed together to calculate the strengths of all fields at a point. The point on this line that has the smallest total field strength may be called the point of least potential. Moving the image in question half the distance between its initial point and the point of least potential is suggested as an approach to lowering the overall potential in the layout region, which may be desirable.

The method as described assumes that the layout region is polygonal, because each edge (boundary) of the polygon exerts a force on each image by way of supposed images as shown in FIG. 5. The model could be adjusted to consider layout regions of arbitrary shape by considering the where the boundary of the layout region intersects with vertical and horizontal rays from the image point charge, and computing the effect of supposed images outside the boundary at these intersection points. This implies that the line linking image and supposed image would not necessarily be perpendicular to the boundary at the point of intersection.

The method as described also assumes that the images being laid out are rectangular. The elliptical fields described require some rectangular (or elliptical) shape to define their aspect ratio, so adjusting the model to manage arbitrarily-shaped images can be achieved by determining a rectangle related to each shape. One approach is to use the shape's bounding rectangle, which is an axis-parallel rectangle whose width extends from the smallest to the greatest x-coordinate of the shape and whose height extends from its smallest to its greatest y-coordinate.

The method as described considers the layout of two-dimensional images within a two-dimensional layout region. This may be extended to three-dimensional layout of three-dimensional images (which would be rectangular prisms rather than rectangles) by using ovoid fields, since ovoids can be considered to be three-dimensional ellipses. Where the three dimensional image being represented by a charge has width w, height h and depth d (along the z-axis), where the magnitude of charge is equal to the volume of the image, the equivalent of equations 6 and 7 in three dimensions is the following.

$$E = \frac{Q}{whd\left(\left(\frac{d_x}{w}\right)^2 + \left(\frac{d_y}{h}\right)^2 + \left(\frac{d_z}{d}\right)^2\right)} = \frac{1}{\left(\left(\frac{d_x}{w}\right)^2 + \left(\frac{d_y}{h}\right)^2 + \left(\frac{d_z}{d}\right)^2\right)} \quad \text{(Eq. 11)}$$

Just as the elliptical field described in the model becomes progressively circular when the distance from the point charge to the point of interest exceeds $\sqrt{wh}$, an ovoid field in the model becomes progressively more spherical when the distance p exceeds $\sqrt{wh}$, so the definition of a in three dimensions is the following.

$$\alpha = \frac{whd}{p^2} \quad \text{(Eq. 12)}$$

Where an image is rotated in three dimensions, the rotation of the axes described for the method in two dimensions can be applied by rotating the axes twice in axis-parallel planes. For example, if the base of an image prism is rotated from the x-axis by angle θ and further rotated from the z-axis by angle β, the axes should be rotated in the xy plane by angle θ and then rotated in the yz plane by angle β. The first axis rotation is effected by rotating the x and y coordinates of point positions by –θ using equation 10, then rotating the y and z coordinates of points by –β. The reverse rotations are then applied to the x, y and z components of the three-dimensional force that is computed.

Preferred Embodiment of Apparatus(s)

Figure 7:
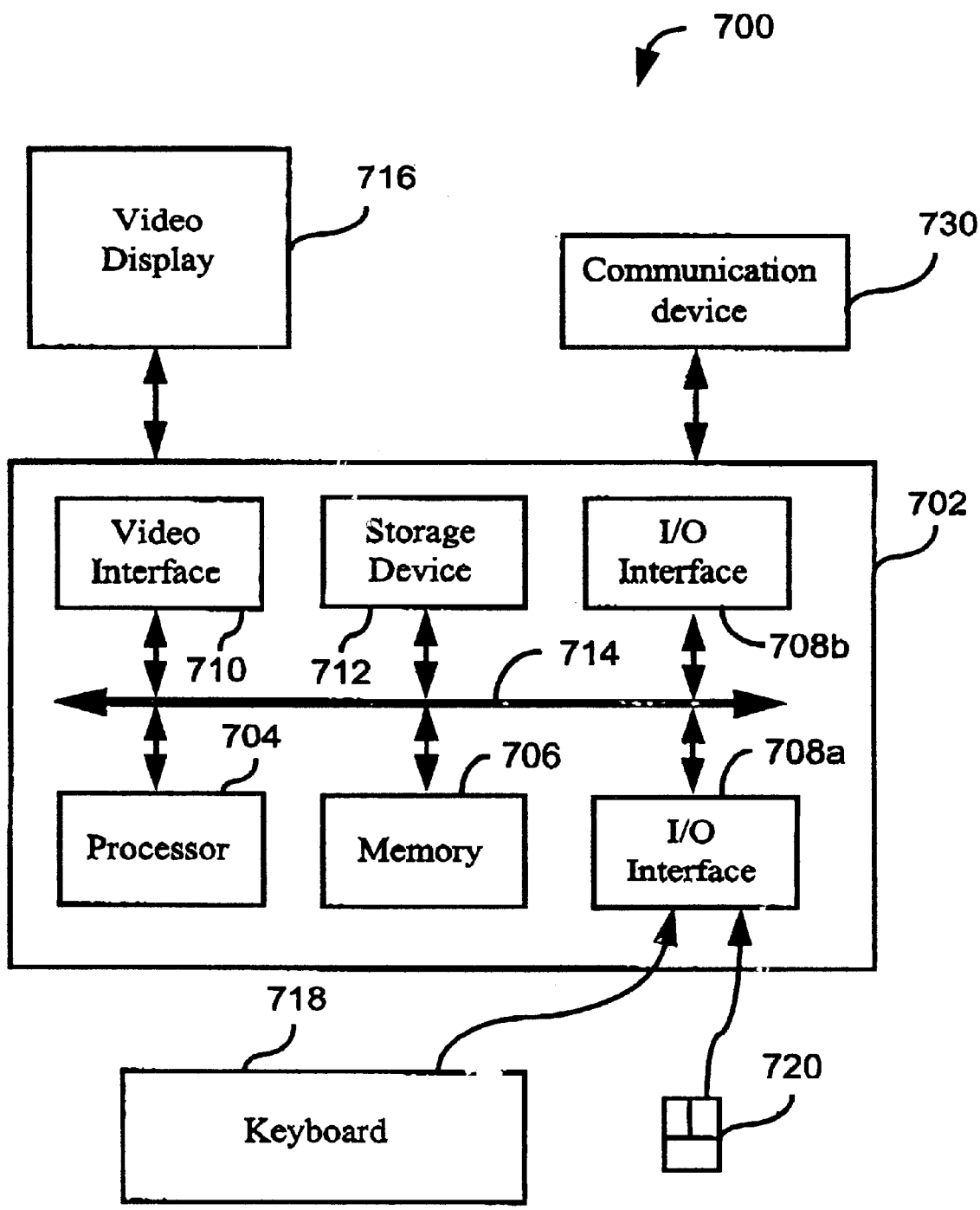
FIG. 7 is a block diagram of a general-purpose computer.

The method of automatically positioning one or more images within a region as shown in FIG. 1 is preferably practiced using a conventional general-purpose computer, such as the one shown in FIG. 7 wherein the processes of FIG. 1 may be implemented as software executing on the computer. In particular, the steps of method of FIG. 1 are effected by instructions in the software that are carried out by the computer. The software may be divided into two separate parts; one part for carrying out the steps of the method of automatically positioning the images; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for automatically positioning one or more images within a region in accordance with the embodiments of the invention.

The computer system 700 consists of the computer 702, a video display 716, and input devices 718, 720. In addition, the computer system 700 can have any of a number of other output devices including line printers, laser printers, plotters, and other reproduction devices connected to the computer 702. The computer system 700 can be connected to one or more other computers via a communication interface 708b using an appropriate communication channel 730 such as a modern communications path, a computer network, or the like. The computer network may include a local area network (LAN), a wide area network (WAN), an Intranet, and/or the Internet The computer 702 itself consists of a central processing unit(s) (simply referred to as a processor hereinafter) 704, a memory 706 which may include random access memory (RAM) and read-only memory (ROM), input/output (IO) interfaces 708a, 708b & 708c, a video interface 710, and one or more storage devices generally represented by a block 712 in FIG. 7. The storage device(s) 712 can consist of one or more of the following: a floppy disc, a hard disc drive, a magneto-optical disc drive, CD-ROM, magnetic tape or any other of a number of non-volatile storage devices well known to those skilled in the art. Each of the components 704 to 712 is typically connected to one or more of the other devices via a bus 714 that in turn can consist of data, address, and control buses.

The video interface 710 is connected to the video display 716 and provides video signals from the computer 702 for display on the video display 716. User input to operate the computer 702 can be provided by one or more input devices 708b. For example, an operator can use the keyboard 718 and/or a pointing device such as the mouse 720 to provide input to the computer 702.

The system 700 is simply provided for illustrative purposes and other configurations can be employed without departing from the scope and spirit of the invention. Exemplary computers on which the embodiment can be practiced include IBM-PC/ATs or compatibles, one of the Macintosh (TM) family of PCs, Sun Sparestation (TM), or the like. The foregoing is merely exemplary of the types of computers with which the embodiments of the invention may be practiced. Typically, the processes of the embodiments, described hereinafter, are resident as software or a program recorded on a hard disk drive (generally depicted as block 712 in FIG. 7) as the computer readable medium, and read and controlled using the processor 704. Intermediate storage of the program and pixel data and any data fetched from the network may be accomplished using the semiconductor memory 706, possibly in concert with the hard disk drive 712.

In some instances, the program may be supplied to the user encoded on a CD-ROM or a floppy disk (both generally depicted by block 712), or alternatively could be read by the user from the network via a modem device connected to the computer, for example. Still further, the software can also be loaded into the computer system 700 from other computer readable medium including magnetic tape, a ROM or integrated circuit, a magneto-optical disk, a radio or infra-red transmission channel between the computer and another device, a computer readable card such as a PCMCIA card, and the Internet and Intranets including e-mail transmissions and information recorded on websites and the like. The foregoing is merely exemplary of relevant computer readable mediums. Other computer readable mediums may be practiced without departing from the scope and spirit of the invention.

The method of automatically positioning one or more images within a region may alternatively be implemented in dedicated hardware such as one or more integrated circuits performing the functions or sub functions of FIG. 1. Such dedicated hardware may include graphic processors, digital signal processors, or one or more microprocessors and associated memories.

The foregoing only describes a small number of embodiments of the present invention, however, modifications and/or changes can be made thereto without departing from the scope and spirit of the invention. The present embodiments are, therefore, to be considered in all respects to be illustrative and not restrictive. The present embodiments are, therefore, to be considered in all respects to be illustrative and not restrictive,

We claim:

1. A method of automatically positioning a plurality of images within a region, the method comprising the steps of:
    (a) computing a net force exerted on each said image by all other said images, wherein the net force exerted on each said image is the total of forces exerted on that image, and wherein any said force exerted on any one said image by any other said image is a function of the distance between the said any one image and the said any other image, a first image characteristic of said any one image and a second image characteristic of said any other image; and
    (b) moving each said image a distance, which is a function of the net force acting on the image, in the direction of the net force.

2. A method as claimed in claim 1, wherein said step (a) comprises the sub-step of:
    (a)(i) computing all fields at each said image due to every other said image, wherein any said field at any said image due to any other said image is a function of the distance between said any image and said any other image and the second image characteristic of said any other image.

3. A method as claimed in claim 2, wherein step (a) further comprises the sub-steps of:
    (a)(ii) summing all the fields at each said image to provide a net field at each said image; and
    (a)(iii) computing the net force exerted on each said image by every other said image, wherein the net force acting on any one said image is a function of the net field acting on the said any one image and the first image characteristic of said any one image.

4. A method as claimed in claim 2, wherein said step (a) further comprises the sub-steps of:
    (a)(ii) computing all forces at each said image due to every other said image, wherein any said force acting on any one said image is a function of a said field acting on the said any one image and the first image characteristic of the said any one image; and
    (a)(iii) summing the forces exerted on each image to produce a said net force at each image.

5. A method as claimed in claim 1, wherein the method further comprises the step of:
    (c) iteratively repeating steps (a) to (b).

6. A method as claimed in claim 5, wherein the iterations stop after a predetermined number of iterations have been completed.

7. A method as claimed in claim 5, wherein the iterations stop after the moved distances are less than a predetermined threshold.

8. A method as claimed in claim 2, wherein the field at any said image due to another said image is inversely proportional to a polynomial of the distance between them.

9. A method as claimed in claim 2, wherein the field at any said image due to another said image is inversely proportional to the distance between them.

10. A method as claimed in claim 2, wherein the field at any said image due to another said image is inversely proportional to the square of the distance between them.

11. A method as claimed in claim 2, wherein the field at any said image due to another said image decreases as the distance between them increases.

12. A method as claimed in claim 2, wherein one or more of said fields have an elliptical field as a near field and a circular field as a far field.

13. A method as claimed in claim 4, wherein one or more of said fields are elliptical fields having a main axis non-parallel with the main axis of the region and step a(i) further comprises the following sub-step for each elliptical field:
    rotating, prior to computing the fields, the main axis of the region by some angle whereby the main axis of the elliptical field is parallel to the main axis of the region; and step a(ii) further comprises the following sub-step for each elliptical field; and
    rotating, after computing the forces, the main axis of the region by an angle equal but opposite to said some angle.

14. A method as claimed in claim 3, wherein one or more of said fields are elliptical fields having a main axis non-parallel with the main axis of the region and step a(i) further comprises the following sub-steps for each elliptical field:
    rotating, prior to computing the fields, the main axis of the region by some angle whereby the main axis of the elliptical field is parallel to the main axis of the region; and
    rotating, after computing the fields, the main axis of the region by an angle equal but opposite to said some angle.

15. A method as claimed in claim 2, wherein the images are defined by a height h and width w and said computing step (a)(i) comprises:
    computing a field E at each said image due to every other said image, where a said field E due to a said image at a distance p from the centre of the image is $$E = \frac{\alpha}{\left(\frac{d_x}{w}\right)^2 + \left(\frac{d_y}{h}\right)^2} + (1-\alpha)\frac{wh}{d_x^2 + d_y^2},$$

where $$\alpha = \frac{wh}{p^2}$$

when p is greater than $\sqrt{wh}$ and $\alpha=1$ when p is less than or equal to $\sqrt{wh}$, and $d_x$ is the horizontal distance and $d_y$ is the vertical distance components of distance p.

16. A method as claimed in claim 1, wherein said first and second image characteristic are the same.

17. A method as claimed in claim 1, wherein said first and second image characteristic are different.

18. A method as claimed in claim 16, wherein the first image characteristic is the surface area wh of the image.

19. A method as claimed in claim 16, wherein the first image characteristic is the perimeter 2w+2h of the image.

20. A method as claimed in claim 2, wherein said step (a) comprises:
   computing the total of forces exerted on each said image by every other said image, wherein said total of forces acting on any one said image is equal to the sum of the fields acting on the said any one image multiplied by the surface area wh of the said any one image.

21. A method as claimed in claim 1, wherein said step (b) comprises moving each said image a distance equal to a proportional factor of the net force exerted on it, in the direction of the net force.

22. A method as claimed in claim 21, wherein the proportional factor is equal to 0.001.

23. A method as claimed in claim 21, wherein the proportional factor is determined during the first iteration.

24. A method as claimed in claim 1, wherein the force on any said image by a boundary of the region is the same as would be exerted by an imaginary image of the same shape and size on the opposite side of the boundary at the same distance from the boundary.

25. A method as claimed in claim 1, wherein said plurality of said images comprise one image and a plurality of imaginary images, wherein the imaginary images are the same shape and size of said one image, are located on the opposite side of a corresponding boundary of the region, and exert a said force on said one image.

26. A method as claimed in claim 1, wherein said images, region and field are two-dimensional.

27. A method as claimed in claim 1, wherein said images, region and field are three-dimensional.

28. A method as claimed in claim 1, wherein said step (b) comprises moving each said image a distance dependent upon acceleration and instantaneous velocity associated with the net force and mass of the image, where said mass is dependent on the size of the image.

29. A method as claimed in claim 1, wherein said region is a page on a electronic photo-album.

30. A method of automatically positioning a plurality of images within a layout region, wherein the images are defined by a height h and width w and the method comprises the following steps of:
   (a) computing a field E at each said image due to every other said image, where a said field E due to a said image at a distance p from the centre of the image is $$E = \frac{\alpha}{\left(\frac{d_x}{w}\right)^2 + \left(\frac{d_y}{h}\right)^2} + (1-\alpha)\frac{wh}{d_x^2 + d_y^2},$$

where $$\alpha = \frac{wh}{p^2}$$

when p is greater than $\sqrt{wh}$ and $\alpha=1$ when p is less than or equal to $\sqrt{wh}$, and $d_x$ is the horizontal distance and $d_y$ is the vertical distance components of distance p;
   (b) computing a sum of forces exerted on each said image by every other said image, where said sum of forces acting on any said image is equal to a sum of said fields acting on said any image multiplied by the surface area wh of said any image;
   (c) moving each said image a distance proportional to the sum of forces acting on the image, in the direction of the sum of forces; and
   (d) repeating steps (a) to (c) a predetermined number of times.

31. A method as claimed in claim 30, wherein the force on any said image by a boundary of the region is the same as would be exerted by an imaginary image of the same shape and size on the opposite side of the boundary at the same distance from the boundary.

32. A method as claimed in claim 30, wherein said plurality of said images comprise one image and a plurality of imaginary images, wherein the imaginary images are the same shape and size of said one image, are located on the opposite side of a corresponding boundary of the region, and exert a said force on said one image.

33. A method of automatically positioning one image within a region of one or more other images, the method comprising the steps of:
   (a) computing a net force exerted on said one image by all of said other images, wherein the net force exerted on said one image is the total of forces exerted on that image, and wherein any said force exerted on said one image by any one of said other images is a function of the distance between the said one image and the said any one of the said other images, a first image characteristic of said one image and a second image characteristic of said any one of the said other images; and
   (b) moving said one image a distance, which is a function of the net force acting on the said one image, in the direction of the net force.

34. Apparatus for automatically positioning a plurality of images within a region, the apparatus comprising:
   means for computing a net force exerted on each said image by all other said images, wherein the net force exerted on each said image is the total of forces exerted on that image, and wherein any said force exerted on any one said image by any other said image is a function of the distance between the said any one image and the said any other image, a first image characteristic of said any one image and a second image characteristic of said any other image; and
   means for moving each said image a distance, which is a function of the net force acting on the image, in the direction of the net force.

35. Apparatus for automatically positioning a plurality of images within a layout region, wherein the images are defined by a height h and width w and the apparatus comprises:
   means for computing a field E at each said image due to every other said image, where a said field E due to a said image at a distance p from the centre of the image is $$E = \frac{\alpha}{\left(\frac{d_x}{w}\right)^2 + \left(\frac{d_y}{h}\right)^2} + (1-\alpha)\frac{wh}{d_x^2 + d_y^2},$$

where $$\alpha = \frac{wh}{p^2}$$

when p is greater than $\sqrt{wh}$ and $\alpha=1$ when p is less than or equal to $\sqrt{wh}$, and $d_x$ is the horizontal distance and $d_y$ is the vertical distance components of distance p;
   means for computing a sum of forces exerted on each said image by every other said image, where said sum of forces acting on any said image is equal to a sum of said fields acting on said any image multiplied by the surface area wh of said any image;

means for moving each said image a distance proportional to the sum of forces acting on the image, in the direction of the sum of forces; and means for repeating the operations of the means for computing a field, the means for a sum of forces, and the means for moving a predetermined number of times.

36. Apparatus for automatically positioning one image within a region of one or more other images, the apparatus comprising:

means for computing a net force exerted on said one image by all of said other images, wherein the net force exerted on said one image is the total of forces exerted on that image, and wherein any said force exerted on said one image by any one of said other images is a function of the distance between the said one image and the said any one of the said other images, a first image characteristic of said one image and a second image characteristic of said any one of the said other images; and means for moving said one image a distance, which is a function of the net force acting on the said one image, in the direction of the net force.

37. A computer readable medium comprising a computer program for automatically positioning a plurality of images within a region, the computer program comprising:

code for computing a net force exerted on each said image by all other said images, wherein the net force exerted on each said image is the total of forces exerted on that image, and wherein any said force exerted on any one said image by any other said image is a function of the distance between the said any one image and the said any other image, a first image characteristic of said any one image and a second image characteristic of said any other image; and code for moving each said image a distance, which is a function of the net force acting on the image, in the direction of the net force.

38. A computer readable medium as claimed in claim 37, wherein said code for computing a net force comprises:

code for computing all fields at each said image due to every other said image, wherein any said field at any said image due to any other said image is a function of the distance between said any image and said any other image and the second image characteristic of said any other image.

39. A computer readable medium as claimed in claim 38, wherein said code for computing a net force further comprises:

code for summing all the fields at each said image to provide a net field at each said image; and code for computing the net force exerted on each said image by every other said image, wherein the net force acting on any one said image is a function of the net field acting on the said any one image and the first image characteristic of said any one image.

40. A computer readable medium as claimed in claim 38, wherein said code for computing a net force further comprises:

code for computing all forces at each said image due to every other said image, wherein any said force acting on any one said image is a function of a said field acting on the said any one image and the first image characteristic of the said any one image; and code for summing the forces exerted on each image to produce a said net force at each image.

41. A computer readable medium as claimed in claim 37, wherein the computer program further comprises:

code for iteratively repeating the operations of the code for computing the net force and the code for moving.

42. A computer readable medium comprising a computer program for automatically positioning a plurality of images within a layout region, wherein the images are defined by a height h and width w and the computer program comprises:

code for computing a field E at each said image due to every other said image, where a said field E due to a said image at a distance p from the centre of the image is $$E = \frac{\alpha}{\left(\frac{d_x}{w}\right)^2 + \left(\frac{d_y}{h}\right)^2} + (1-\alpha)\frac{wh}{d_x^2 + d_y^2},$$

where $$\alpha = \frac{wh}{p^2}$$

when p is greater than $\sqrt{wh}$ and $\alpha=1$ when p is less than or equal to $\sqrt{wh}$, and $d_x$ is the horizontal distance and $d_y$ is the vertical distance components of distance p;

code for computing a sum of forces exerted on each said image by every other said image, where said sum of forces acting on any said image is equal to a sum of said fields acting on said any image multiplied by the surface area wh of said any image;

code for moving each said image a distance proportional to the sum of forces acting on the image, in the direction of the sum of forces; and code for repeating the operations of the means for computing a field, the means for a sum of forces, and the means for moving a predetermined number of times.

43. A computer readable medium comprising a computer program for automatically positioning one image within a region of one or more other images, the computer program comprising:

code for computing a net force exerted on said one image by all of said other images, wherein the net force exerted on said one image is the total of forces exerted on that image, and wherein any said force exerted on said one image by any one of said other images is a function of the distance between the said one image and the said any one of the said other images, a first image characteristic of said one image and a second image characteristic of said any one of the said other images; and code for moving said one image a distance, which is a function of the net force acting on the said one image, in the direction of the net force.

* * * * *

UNITED STATES PATENT AND TRADEMARK OFFICE
CERTIFICATE OF CORRECTION

PATENT NO. : 6,636,650 B1
APPLICATION NO. : 09/565469
DATED : October 21, 2003
INVENTOR(S) : Long et al.

It is certified that error appears in the above-identified patent and that said Letters Patent is hereby corrected as shown below:

COLUMN 3

Line 61, "comprising" should read --comprising:--.

COLUMN 5

Line 5, "prefer" should read --preferred--.

COLUMN 8

Line 43, "factor a" should read --factor $\propto$ --.

COLUMN 10

Line 58, "the" should be deleted.

COLUMN 11

Line 15, "three dimensional" should read --three-dimensional--.

Line 30, " $\sqrt{wh}$, " should read -- $\sqrt{whd}$, --; and "a" should read -- $\propto$ --.

COLUMN 12

Line 16, "Internet" should read --Internet.--.
Line 43, "Sparestion" should read --Sparcstation--.

COLUMN 13

Line 43, "step (a)" should read --said step (a)--.

COLUMN 14

Line 26, "filed;" should read --field:--; and "and" should be deleted.

UNITED STATES PATENT AND TRADEMARK OFFICE
CERTIFICATE OF CORRECTION

PATENT NO. : 6,636,650 B1
APPLICATION NO. : 09/565469
DATED : October 21, 2003
INVENTOR(S) : Long et al.

It is certified that error appears in the above-identified patent and that said Letters Patent is hereby corrected as shown below:

COLUMN 15

Line 37, "a electronic" should read --an electronic--.

Signed and Sealed this

Twenty-fourth Day of July, 2007

JON W. DUDAS
*Director of the United States Patent and Trademark Office*